United States Patent
Messing

(10) Patent No.: US 7,702,107 B1
(45) Date of Patent: Apr. 20, 2010

(54) SERVER-BASED ENCRYPTED MESSAGING METHOD AND APPARATUS

(76) Inventor: John H. Messing, 3020 N. Willow Creek Dr., Tucson, AZ (US) 85712

(*) Notice: Subject to any disclaimer, the term of this patent is extended or adjusted under 35 U.S.C. 154(b) by 1296 days.

(21) Appl. No.: 11/161,225

(22) Filed: Jul. 27, 2005

(51) Int. Cl.
*H04L 9/32* (2006.01)

(52) U.S. Cl. ...... 380/259

(58) Field of Classification Search ...... None
See application file for complete search history.

(56) References Cited

U.S. PATENT DOCUMENTS

| | | | | |
|---|---|---|---|---|
| 5,475,757 A * | 12/1995 | Kelly | | 713/159 |
| 5,604,801 A * | 2/1997 | Dolan et al. | | 713/159 |
| 5,751,814 A | 5/1998 | Kafri | | |
| 6,363,154 B1 * | 3/2002 | Peyravian et al. | | 380/283 |
| 6,584,564 B2 * | 6/2003 | Olkin et al. | | 713/152 |
| 6,728,378 B2 | 4/2004 | Garib | | |
| 6,947,556 B1 * | 9/2005 | Matyas et al. | | 380/29 |
| 7,167,981 B2 * | 1/2007 | Tanimoto | | 713/163 |
| 2001/0054073 A1 * | 12/2001 | Ruppert et al. | | 709/206 |
| 2002/0007453 A1 * | 1/2002 | Nemovicher | | 713/155 |
| 2002/0023057 A1 * | 2/2002 | Goodwin et al. | | 705/50 |
| 2002/0091928 A1 * | 7/2002 | Bouchard et al. | | 713/181 |
| 2002/0164987 A1 * | 11/2002 | Caronni et al. | | 455/445 |
| 2002/0169971 A1 * | 11/2002 | Asano et al. | | 713/193 |
| 2003/0202661 A1 * | 10/2003 | Rodriguez et al. | | 380/239 |
| 2005/0004881 A1 * | 1/2005 | Klug | | 705/401 |
| 2005/0210246 A1 * | 9/2005 | Faure | | 713/167 |
| 2005/0266836 A1 * | 12/2005 | Shan | | 455/417 |
| 2006/0259468 A1 * | 11/2006 | Brooks et al. | | 707/3 |
| 2008/0044023 A1 * | 2/2008 | Zorea et al. | | 380/270 |

* cited by examiner

*Primary Examiner*—Emmanuel L Moise
*Assistant Examiner*—David J Pearson

(57) ABSTRACT

A method and system for server-based encrypted messaging that uses a receiver-determined password to symmetrically encrypt messages that are intended for that receiver. A sender authenticates to a Recipient Password Server in order to generate a message and optionally to upload attachments, which are enclosed in a virtual envelope that is digitally signed. Each envelope is encrypted with the intended recipient's password and sent either as an email attachment or by other messaging protocol. Messages intended for multiple recipients are each custom encrypted with the individual recipient's password and mapped to the correct identity and reception point. Users can change their passwords at any time. A method is also included to support secure searches of a collection of encrypted envelopes for exact words and phrases.

8 Claims, 3 Drawing Sheets

SERVER-BASED ENCRYPTED MESSAGING METHOD AND APPARATUS

CROSS REFERENCES TO RELATED APPLICATIONS

None.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND

Field of Invention

In accordance with the prior art of symmetric key cryptographic, a sender of a message uses a key to encrypt the message that a recipient of the message also needs to decrypt it. Each message requires its own key. In one prior art embodiment standard encryption algorithms are used in the software of senders and receivers alike, and human-readable passwords to recreate symmetric keys using a standard algorithm only are transmitted. It has thus been a long-term perceived limitation of prior art that symmetric-key systems necessitate the transmission of a password between the sender and the recipient of each message in order to make use of the benefits of the symmetric algorithms. The prior art perceived limitation further postulates that password compromise during transmission of the symmetric key between the sender and receiver is an inherent risk of the technology that can enable an unauthorized party to view the contents of confidential communications.

The prior art perceived limitation led to the development of asymmetric cryptography, which postulates two types of keys for messaging purposes that are mathematically related—public keys and private keys. Senders encrypt messages using the public keys of the recipients. Each recipient has a private key that is used to decrypt the messages intended for that recipient. The public key does not require a password to activate it, and it is freely distributed, while the private key is guarded and does usually require a human password to activate. Having the public key does not enable an attacker to derive the properties of the corresponding private key. This system overcame the perceived prior limitation of symmetric cryptography in that it did away with a need for password transmission. One simply freely distributes an unlimited number of public keys, any of which encrypts messages and optionally attachments intended for a particular receiver, but only the receiver can decrypt the message and attachments with the private key.

One public-key cryptographic system that is in use is the RSA cryptographic system. Each user in this system has a unique public key and a unique private key. A sender may obtain the public key of a given recipient from a key server over the Internet. To ensure the authenticity of the public key and thereby defeat possible man-in-the-middle attacks, the public key may be provided to the sender with a certificate signed by a trusted certificate authority. The certificate verifies that the public key belongs to the intended recipient of the sender's message. Public key encryption systems such as the RSA system that use this type of traditional approach are referred to herein as PKI cryptographic systems.

Use of PKI instead of symmetric cryptography for messaging also entailed certain disadvantages. First, PKI keys require much more computing power to encrypt and decrypt messages than symmetric keys, and they correspondingly significantly contribute to a degradation of computer performance and threaten scalability of Internet server applications which are designed for large numbers of simultaneous transactions. Secondly, RSA types of keys are based upon mathematical combinations of prime numbers, whose combinations are subject to disassembling or factoring attacks to discover the prime numbers. Factoring becomes easier as ordinary computers become more powerful and can be linked together to simulate super-computers, enabling breaking the encryption keys and decrypting the messages by unauthorized parties. Asymmetric encryption methods to secure email during transmission also require users to obtain, install, and periodically replace encryption keys and/or digital certificates, and to the extent necessary to fulfill these tasks, to understand asymmetric cryptosystems, which many users are unwilling or unable to do. These disadvantages therefore render PKI inconvenient and awkward in practice. Symmetric cryptography, which requires users only to know about passwords, is thus usually considered to be more user-friendly than PKI.

The perceived limitation of prior art—that symmetric keys require transmission of a password from the sender to a receiver for each message—also has the unfortunate consequence of rendering symmetric keys inconvenient for sending copies of messages to multiple recipients. Either each copy of the message has the same password, which is easier for senders but multiplies the risk of unauthorized capture and use of the password proportionally to the number of transmissions involved, or else each message copy needs its own unique password for each recipient, which is more secure but awkward and inconvenient for senders to implement, depending on the number of recipients of each password-protected message.

An example of prior art that suffers from the perceived limitations of conventional symmetric cryptography is Kafri, "File encryption method", U.S. Pat. No. 5,751,814, which discloses a method for transmitting symmetrically encrypted files from a sender to a receiver, including steps of encrypting the file as text of an email message to be sent, concatenating the encrypted text together with the encryption password, and appending the concatenated string at the end of a decryption application to produce a combined file. The combined file is then converted to an electronic mail format and sent to a designated recipient. To decrypt the sent message, the recipient must de-concatenate the file into its constituents and run the decryption application, using password input from the individual seeking to decrypt the message. If the password inputted by the individual matches the password concatenated with the encrypted message and decryption application, the decryption application is activated and decrypts the encrypted message. However, Kafri still unquestioningly accepts the perceived limitation of prior art which postulates that each message requires a password from a sender that is transmitted to a receiver and which must be protected in transit. Kafri does not eliminate the threat of password discovery: the combined file containing the password which is transmitted to the receiver from the sender is itself still subject to capture, attack by way of reverse engineering and subsequent extraction of the symmetric key. Second, the decryption application of the combined file is capable of decrypting the encrypted message and only requires password-activation to do so. Since the function of the password is only to activate the decryption application, an unauthorized person could de-concatenate the combined file and seek to activate the decryption application or a derivation thereof without using the password. In view of these multiple disadvantages, it is clear that a more secure system for sending and receiving messages would be one which does not require the sender of the message to create a password for each message and to transmit such password to the receiver. Still another disadvantage of Kafri is that it does not allow for individualized passwords for each copy of a message to multiple users and so it is not readily scalable for use by Internet server applications.

Garib, U.S. Pat. No. 6,728,378 also assumes that a password encryption key must be transmitted from the sender to the receiver for each message, but Garib postulates a web application either as a Java applet or Javascript running inside of a web page instead of a stand-alone application to protect the password by intermediating decryption of the message as in Kafri. Since the message travels by email which is different from the web application which transmits the Java applets and Javascript of a web browser, the intermediating application is not so easy to capture and reverse engineer as the program in Kafri, and the use of web technologies creates a greater (but unquantifiable) likelihood of robust Internet usage.

However, Garib only makes learning the password that is transmitted incrementally more difficult than Kafri and does not significantly eliminate the threat of password discovery altogether. Both Garib and Kafri fall into the erroneous trap of assuming that the prior art perceived limitation of symmetric encryption—that a sender must create and transmit a password to decrypt a message each time one is sent, which renders the password vulnerable—is insolvable.

The prior art perceived limitation is overcome by the present invention, as described in that which follows.

OBJECTS AND ADVANTAGES

A primary object of the present invention is to provide a server based encrypted messaging system that uses symmetric encryption but which does not also require transmission of a password from a sender to a receiver for a message, and thus overcomes the perceived limitation of prior art.

Another object of the present invention is to provide a server based encrypted messaging system that supports multiple receivers to a single message without also requiring a sender to use a single password for all of them or to create separate passwords that must be separately communicated to each of them, and thus is scalable in terms of Internet transactions.

Another object of the present invention is to provide a server based encrypted messaging system that does not rely upon asymmetric encryption to protect message confidentiality and that thus does not require users to obtain encryption keys and digital certificates, replace them periodically, and to learn about asymmetric encryption if they are unwilling or unable to do so, but enables them to use symmetric encryption that only requires them to know a password of their own creation and to protect it. A related object is to improve the performance of the server through the use of faster symmetric ciphers.

Another object of the present invention is to provide a server based encrypted messaging system that enables users to search through a collection of encrypted envelopes for a word or phrase through the inclusion of a text file attachment for extraction in each envelope that contains the subject, message body, optional keywords, and date and time of the message and bears the same name with a different file extension as the encrypted envelope so that a user can search through a folder of the collection of envelopes and corresponding text file to find a match on a word or phrase in the text file and using the message name as a guide, select the proper corresponding envelope(s) to open and examine.

Another object of the present invention is to provide a server based encrypted messaging system that enables users securely to establish and change passwords used to encrypt messages originating from the server and directed to them as receivers.

Another object of the present invention is to provide a server based encrypted messaging system that enables senders to request and obtain a digitally signed receipt from intended receivers for encrypted envelopes which the server allows them to access.

Another object of the present invention is to provide a server based encrypted messaging system that enables authorized requesters to monitor the state of current transmissions and to confirm prior ones, and to verify the authenticity of transmitted envelopes.

Another object of the present invention is to provide a server based encrypted messaging system that obtains messages and file attachments from web servers and web services in addition to individuals using web browsers and that transmits encrypted envelopes to web servers and as web services, by peer file sharing, ftp, soap or http and equivalent methods of transmission, in addition to transmissions to individuals via email.

Another object of the present invention is to provide a server based encrypted messaging system that utilizes electronic signatures to sign receipts for messages.

Another object of the present invention is to provide a server based encrypted messaging system that manages authentication of senders and requestors, credit card facilities, and billing and payment services.

Other objects and advantages of the present invention will become obvious to the reader and it is intended that these objects and advantages be acknowledged as within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

SUMMARY OF THE INVENTION

The present specification describes a method of messaging, which includes any file attachments to the messages, that departs from the prior art perceived limitation of symmetric encryption based upon an assumed need for transmission of a password generated by a sender with regard each message, and instead uses a trusted server to store and apply passwords created by message receivers and known only to them that encrypt messages transmitted to them. The server matches a recipient's password with the recipient's identity and email address for each transmission that is directed to the receiver, regardless of the sender. A sender does not need to create a password for a receiver to decrypt a message. The receiver is the only one who knows the decryption password for messages directed to that receiver. Messages that are directed to multiple recipients are each custom encrypted at the server with the password of the respective recipient. This is novel and unanticipated by prior art.

Messages and attachments to messages are first encapsulated in a virtual container or envelope (hereinafter referred to as an "envelope"), which is digitally signed and symmetrically encrypted. Digital signing is used as a tamper-evident seal and to prove the authenticity of the envelope, the trusted server as the origin of the envelope, and an asserted identity of a sender. The encrypted envelope is attached to a simple text email message that alerts a recipient that an encrypted container is attached. The recipient opens the encrypted container using the recipient's own password in order to view and extract the envelope's contents. Each recipient's password is stored, maintained and administered at the server. For security, passwords are transmitted from users to the server over a secure SSL or TLS channel using a web browser and optionally are symmetrically encrypted for storage at the server. If encrypted, they are dynamically decrypted in memory as they encrypt outgoing envelopes. A user can change passwords at any time.

The method enables password-protect messages and attachments directed to one or a plurality of different receivers without a sender ever knowing or having to transmit the value of a password that will be required to decrypt them. Each user creates and updates an individualized and secret password that is known only to the user, and which is securely supplied to the server, securely stored, and applied by it to outgoing messages intended only for that user. The password decrypts the copy of an envelope that is sent to such user by a sender using the system. This method provides a way to apply passwords that can be periodically updated by the user over a secure connection to the server for security without also sharing the secret value of the password with anyone else and thus preserves privacy and enhances security by comparison with prior art.

The present invention also comprises features to facilitate the authentication, encryption, digital signature, message digesting, logical association, storage and reporting features, and associated billing, administrative, enrollment, collection and other such related functions.

The present invention satisfies a need in the marketplace for electronic security of confidential and privileged communications. It posits a trusted server repository that sits between the senders and receivers of the messages, attachments, documents, data collections and objects and acts as a hub for such transactions. Each payload item presented for transmission is received electronically and embedded in an encrypted envelope. Each encrypted envelope is message digested using a hashing algorithm before sending and the results are recorded, with unique, novel and unanticipated tamper-evident cryptographic protections. A server computer, referred to in this invention as a "Recipient Password Server" stores meta-data such as for example, the identity of the machines or individuals who were responsible for sending or receiving actions, and the dates and times of various recorded actions. It creates a logical association between senders, receivers, and envelopes containing documents, data and objects through cryptographic identifiers that link the envelopes to the dates and times, machines and/or humans through database entries and/or in the digitally signed reports of them as proof of the facts thus memorialized. It encrypts such stored meta-data that could reasonably be expected to compromise privacy if accessed by unauthorized persons or entities. It provides user interfaces for a personal computer or handheld device, and a machine interface for servers that provide such information without human participation in the bulk of their transmissions.

A Recipient Password Server has an outgoing transmission service which is responsible for encrypting messages and attachments using recipients' passwords. It has an authentication service to identify machines and humans that transmit to or communicate with it. It also has a security and repository service which makes the envelopes tamper-evident, and creates, stores and retrieves logical associations between the envelopes, the humans, machines, dates and times, the recorded events, and cryptographic identifiers. It has a reporting service that by digitally signed reports enables authenticated parties to monitor the status of current transmissions and obtain information about completed ones. A Recipient Password Server has interfaces to receive electronic data, documents or objects from machines or humans. It uses a network to receive from and transmit to persons, business entities, governmental agencies, courier services, and other entities and individuals. A Recipient Password Server may generate some of the document, data and objects used in the transmissions, and it may also obtain some or all of the rest of them from other individuals and systems.

A machine interface in a first preferred interface embodiment uses XML documents or XML data exchanges to transmit attachments consisting of documents, data collections and objects using various protocol methods, such as SMTP, SOAP, FTP, HTTP or peer to peer networking. A transmitting machine or other machines or individuals further upstream may already have accomplished aggregation of messages and attachments to messages, consisting of documents, data collections and objects, prior to their encryption and transmission by the Recipient Password Server. For example, a title company could have digitally signed documents relating to a loan closing, with one of its employees acting as notary. Such a notary will have witnessed in person the document signatures for a loan closing and have filled out an acknowledgment, certificate or jurat attesting to the signature. The title company machine digitally signs and transmits copies of the electronically signed and notarized documents, data collections and documents and the jurat, certificate or acknowledgment of the notary, in electronic format, by machine-to-machine transfer to the Recipient Password Server over an SSL or TLS connection. The Recipient Password Server puts all of the documentation and information into one or more encrypted envelopes as attachments to email messages for secure, private and confidential transmission via email over the Internet to the entities, individuals and agencies that are solely intended to receive the information, matching the passwords used to encrypt the envelopes with the passwords and email addresses of the intended recipients, also including a copy to the sender, so that only the intended recipients can access the copy addressed to such intended recipient. Alternatively, the encrypted envelopes are sent to their respective network locations via SOAP, HTTP, HTTPS, or web services by machine-to-machine transfer, instead of by email.

A human user interface is described in this specification as a second preferred interface embodiment, where an individual uses HTML, PDF, FLASH or XML forms presented as web pages from a server to supply email delivery information and to upload files directly to the Recipient Password Server for secure transmission to one or more individuals, entities or agencies. The Recipient Password Server receives and processes such supplied information, which typically includes matters like the recipient name(s) or email address(es), subject line, keywords, message text and uploaded files for delivery; the properties of a digital certificate or biometric identifier tendered by the sender for authentication, if any, and any other information that is required by agreement, or business or legal requirement between the sender and the one or more recipients. The Recipient Password Server can even present an interface for a user to locate a recipient from one of a collection of names and contact information of enrolled users of the Recipient Password Server, for ease of use.

With respect to the envelope that is used to encapsulate the messages and attachments for secure delivery, binary PDF files known to prior art and themselves in no way claimed by this invention are the preferred envelope embodiment. The documents, data and objects to be encapsulated as attachments to messages in the envelope are in a first preferred transmission embodiment, transmitted to the Recipient Password Server using channel layer encryption such as SSL or TLS, whether they come from servers, as in the case of a title company computer transmitting data in real time as an XML feed, or individuals using desk-top, lap-top or hand held computing devices, which may include Blackberry's, cellphones, personal digital assistants or other wired or wireless computing devices, or a combination of any of the foregoing. When a digital certificate is presented to the Recipient Password Server for SSL/TLS channel encryption or alternatively in connection with authentication of an existing envelope, the Recipient Password Server automatically checks the digital certificate, if any, of the machine or individual for current status, and if valid, records it as metadata authenticating a place of origin or sender of a secure transmission.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining in detail at least one preferred embodiment of the invention, with explanations of others as relevant, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS—FIGS. 1-3

Various other objects, features and attendant advantages of the present invention will become fully appreciated as the same become better understood when considered in conjunction with the accompanying drawings, in which by means of like reference characters designate the same or similar parts throughout the several views, and wherein.

DESCRIPTION OF THE PREFERRED EMBODIMENT

To achieve the previously-identified objectives, the present inventive device utilizes an independent central processing unit (hereinafter a "Recipient Password Server") which interfaces with one or a plurality of senders and one or a plurality of recipients to securely transmit messages and attachments consisting of data collections, documents or objects between senders and recipients. A user interface to an online application enables the encryption and transmission of encrypted envelopes, each matched to the identity, network location and password of an intended receiver such that only the intended receiver can open the container and extract the message and attachments intended for that user that was sent to the user's network location, and it may employ one or a plurality of tools such as a queue to improve server performance.

DESCRIPTION-FIGS. 1-3

Figure 1:
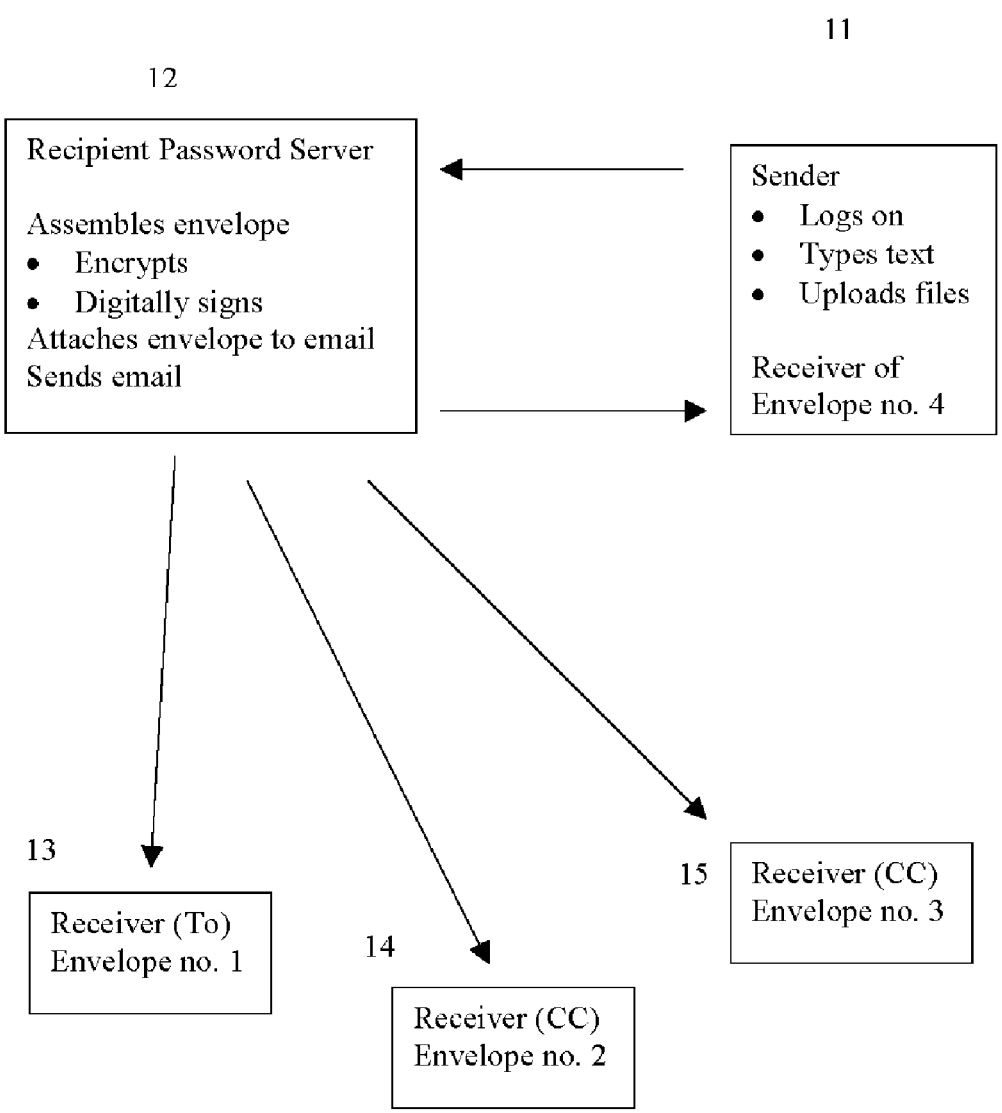
FIG. 1 depicts the transmission of a message and attachments from a sender to a plurality of receivers, which also includes a copy to the sender as one of the receivers, using the Recipient Password Server.

FIG. 1 depicts a first preferred embodiment in which a sender, FIG. 1, no. 11, logs on to the Recipient Password Server using a PIN, username or password, personal digital certificate, biometric identifier, one-time password, or single sign-on such as SAML or WSS, credit card authorization from a processor or combination of any of the foregoing as authentication. The sender provides information by way of web forms to the Recipient Password Server, FIG. 1, no. 12, and uploads files to it, consisting of documents, data collections and objects for transmission. The information provided using the web forms is used to identify for routing the intended recipient(s) and create the subject lines and the body of a message, and optionally a list of keywords used to enable a search capability. The message digest value of each encrypted envelope is captured and stored, together with information about the transaction, at the Recipient Password Server. Message digests of the uploaded files that are to be encapsulated as attachments to a message inside of the encrypted envelope may also optionally be captured and stored in the file upload process.

FIG. 1 depicts a plurality of receivers. Following conventional email terminology, the user at FIG. 1 no. 13 is the person TO whom the message is principally directed, and the users at FIG. 1, no. 14 and no. 15 are persons who are copied as CC on the message. Optionally there can be a BCC user, who receives a copy but is not listed on the distribution list as a recipient. The user at FIG. 1, no. 11 is the sender. Each of these identified users receives a customized encrypted version of the envelope. Upon activation by the sender, the Recipient Password Server first assembles the envelope, embeds text that the sender supplied for the distribution list, subject and message body into the envelope itself, and loads the uploaded attachments, if any, into the envelope. It then digitally signs the envelope with its private key as proof of origin and a tamper-evident seal, using a digital certificate issued to it from a certificate authority for this purpose. It then symmetrically encrypts each copy of the envelope using a symmetric key that is based upon or derived from each intended recipient's most recent password. It matches the encrypted envelopes to the email addresses and identity of the recipients so that each recipient receives only a copy that can be decrypted via a reconstructed key that enables the recipient to open and view the envelope's contents when that recipient's correct password is supplied.

As one skilled in the art will appreciate, a user interface includes forms to be completed by keyboard, mouse, touchscreen, stylus or voice activation. Such user interface also enables a human to electronically trigger an action by a mouse, touching a screen, presenting a finger or other body part to a device, entering text by keyboard or dictation, moving a stylus across a pad or screen, iris scan, word commands, presenting facial features to a device, or providing a sample of DNA.

A machine provides its digital certificate information upon SSL session initiation, or includes it with a digitally signed message. Such information describes a chain of intermediate certificate authorities responsible for identity determinations up to a root certificate and thereby authoritatively authenticates its machine through a public key infrastructure. Such response also can yield the certificate revocation information, as is well known in the art. Other methods of machine authentication include static IP address, or HMAC, or a combination of them. An encrypted transfer of data between machines that uses a public asymmetric key of one of them or a shared symmetric key that is known to both of them is another way to authentic a machine. In such transfers, the keying information identifies the machine or a user of the machine. Such machines or others upstream of them can also provide user interfaces to authenticate users and logically associate them and the documents, data and objects to be included as attachments to a message through cryptographic identifiers.

A user interface enables human beings to provide data, documents or objects that are messages and attachments to messages and requests to a Recipient Password Server and obtain information from it about pending or completed transmissions. A user interface for sending messages with optional attachments will also include options to specify one or a plurality of recipients, the Internet locations of each of them, a subject line; a message body; and file attachments to be included. It will also query and store a reliable date and time value from a trusted source such as the U.S. National Institute of Standards and Technology and parse any digital certificate or other authentication information that is available, such as biometric identifier, of a sender, the current date and time of the transaction initiation, the total number of documents, data collections or objects to be included as attachments, and/or an identifier of the transmission used internally by an enterprise to identify this transaction in its data systems. Alternatively, where a server, such as one operating from an entity or agency, has collected such information, it is bundled with the associated documents, data collections, or objects for transmission, and unbundled, to the extent required and practical, at the Recipient Password Server for verification, prior to embedding in an encrypted envelope. Such transmitted and supplemented metadata about a transmission optionally is again logically associated with the cryptographic identifier of the envelope and optionally of the documents, data collections and objects which it contains, which is stored in a database table for later availability and retrieval.

The user interface also enables a human sender to supply the documents, data collections and objects as attachments to messages through one or a plurality of file upload form fields using HTTP 1.1, which optionally is secured via HTTPS. The message digest values and labels of them optionally can be stored as transaction metadata and as a way of verifying the authenticity of individual attachments later in reports. The message digest value of the envelope in a first preferred embodiment and/or its detached asymmetrically encrypted message digest value, which is well known as a detached digital signature in prior art, in a second preferred embodiment, is also captured and retained for reporting purposes.

The Recipient Password Server stores such message digests and logical associations in a database of data and logical associations for verification purposes, which is optionally encrypted as to personally identifiable information. It uses the stored information, whether duplicate original or parsed and archived to generate a digitally signed (by it) report attesting to the transmission in accordance with applicable business or legal rules. It also logically associates the envelope message digests and stores the values in logical association with other archived information about a transaction in the database, with date and time of respective events.

To support long term archiving, the Recipient Password Server also generates digitally signed proofs of transmission upon request, and uses the current logical associations stored at the Recipient Password Server and their reported tamper-free state as a data source for the responses. A symmetrically encrypted log record is another option to the record of logical associations stored by the Recipient Password Server. Periodically, such encrypted log can be timestamped by a trusted timestamping authority as a protection against tampering.

Figure 2:
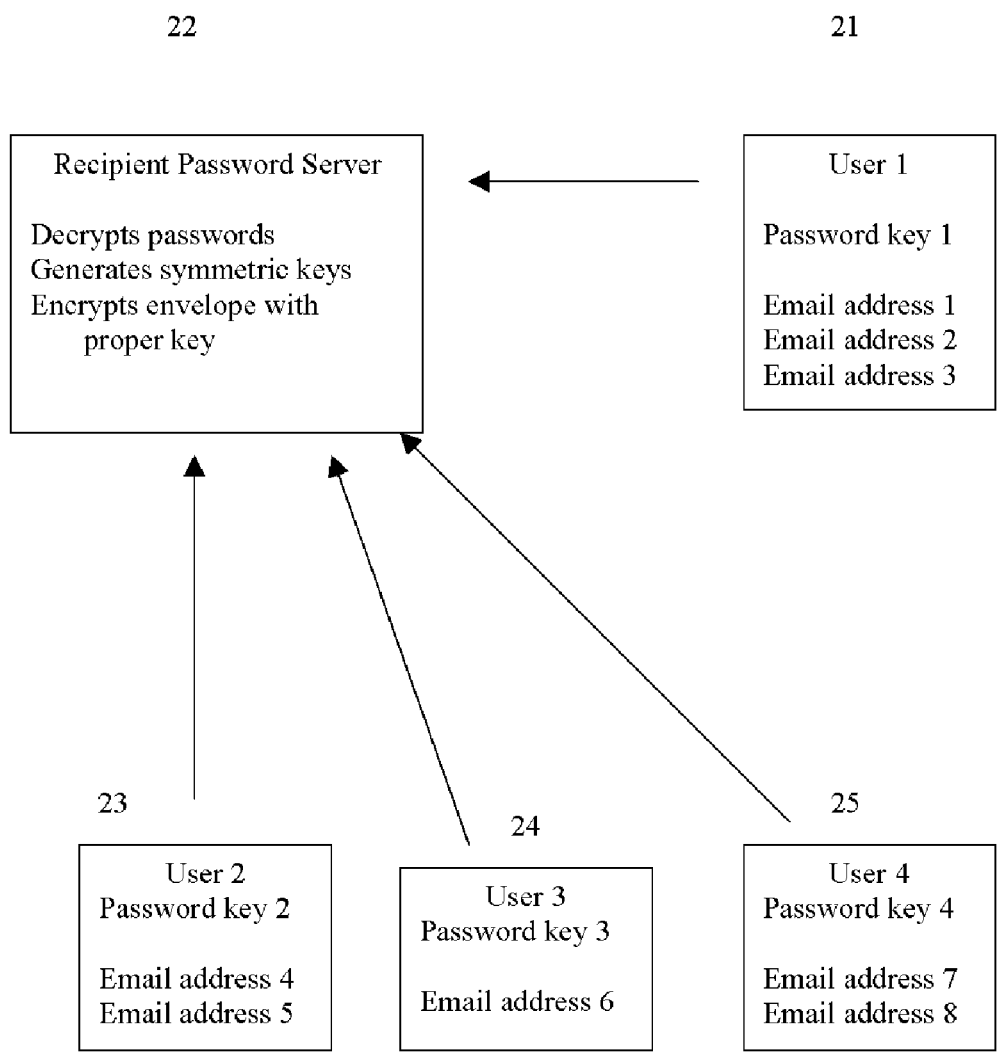
FIG. 2 depicts the provision of passwords to the Recipient Password Server from a plurality of users which are matched to the encrypted envelopes intended for each of the respective users.

FIG. 2 depicts a Recipient Password Server's management of recipient passwords. When a user initially establishes or later changes a recipient password, the user must first authenticate to the Recipient Password Server by a PIN, username or password, personal digital certificate, biometric identifier, one-time password, or single sign-on such as SAML or WSS, or combination of any of the foregoing. An SSL or TLS web application enables an authenticated user to enter and re-enter a new password securely, which the Recipient Password Server uses to encrypt future communications directed to the recipient. As recipients never share or communicate the passwords that are used to open envelopes between themselves, even in their respective roles and senders and receivers, the security of each recipient's password is enhanced over prior art. Older passwords, which are indefinitely required to open older messages that were sent when the older passwords were still current, can optionally be archived and stored in encrypted fashion at the Recipient Password Server for future reference by their respective, properly authenticated recipient-owners.

The Recipient Password Server also permits the association of a single identity with not only an updatable password, but also one or a plurality of Internet locations to receive encrypted envelopes, which in the preferred embodiment are email addresses of the recipient. This enables a recipient to maintain a single identity with multiple reception points for encrypted envelopes. Thus, in FIG. 2, User 1, no. 21, has a single identity, with one password that the Recipient Password Server uses to encrypt envelopes intended for the recipient, but a total of three email addresses where such encrypted envelopes can be sent. Similarly, User 2, in FIG. 2, no. 23, has a single identity and password, but two email addresses where encrypted envelopes can be sent. In FIG. 2, no. 24, User 3 has only one such email address, but in FIG. 2, no. 25, User 4 has two such email addresses. One advantage of the invention is that each user can be mobile with regard to receiving messages at various Internet locations, which promotes scalability. In another embodiment of the invention, optionally a user can establish multiple identities each having its own password with its own email addresses, and multiple single user identities can share email addresses between them.

Tamper-evident logical associations are used to verify the authenticity of a copy of an envelope when a report of a transmission or its contents is requested. They can be used to check that an envelope that is believed to have been transmitted is authentic. They constitute a long-term storage of archived information that is tamper-evident against corruption or intentional modification or sabotage and are unlimited as to period of validity.

Figure 3:
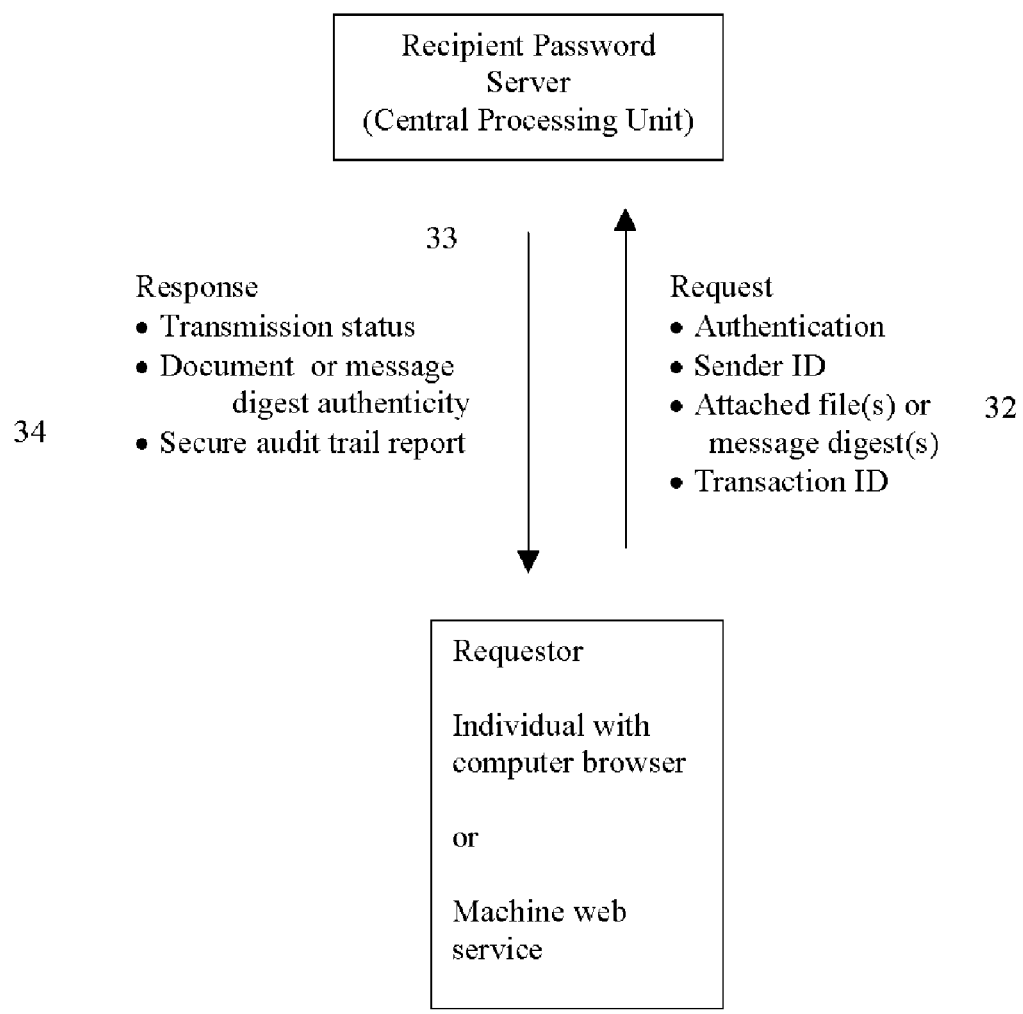
FIG. 3 depicts an optional reporting feature of the Recipient Password Server which allows querying the server for information about transmissions including the authenticity of one or a plurality of envelopes that were transmitted, and enables a digitally signed response.

FIG. 3 depicts a type of transaction request made about a current or past transmission. A requestor, FIG. 3, no. 31, sends a request to the Recipient Password Server, FIG. 3, no. 33. Authentication of a human requestor may be optionally required using the methods described earlier in this specification FIG. 1, including by credit card authorization. The user interface prompts a user, FIG. 3, no. 32, for information to locate the envelope information, which consists alternatively of one or a plurality of a message identifier, date and time of transmission, sender/recipient identity, or a copy for upload of the particular transaction envelope or a message digest of such envelope, or a combination of the foregoing. The response from the Recipient Password Server, FIG. 3, no. 34, containing the requested information, in a first preferred embodiment, is digitally signed with a private key currently identified by a then-valid digital certificate from a certification authority. If the requesting party furnishes an uploaded envelope to determine if it is authentic, or provide alternatively a message digest of such envelope, the Recipient Password Server performs a check of the message digest value of the uploaded envelope or of the provided message digest against the original value that was stored in the database, decrypting the stored message digest if it has been encrypted while in storage in the database.

In a separate embodiment of the invention, the sender can obtain a return receipt from the TO recipient, or any of the other recipients of the envelope. To effectuate a return receipt, the Recipient Password Server sends an email notification that requests the recipient to retrieve the encrypted envelope at the server. The encrypted envelope is not attached to the email. The email contains a cryptographic identifier of the envelope, which in a first preferred embodiment consists of a hash value of the encrypted envelope that is symmetrically encrypted with string password as seed that is comprised of a concatenation of the date and time value and the email address of the recipient, to ensure uniqueness. The cryptographic identifier is annexed to a URL of the server as part of the HTTP GET protocol, which when parsed at the server, enables the server to access a database record that logically associates the file location of the encrypted envelope at the server with the cryptographic identifier of the email, and enables a download of the correctly encrypted envelope to the identified user using the recipient's browser to retrieve it.

In another separate embodiment, the server provides an additional attachment within each encrypted envelope which is a plain text file that includes the date and time, subject line and message body of the encrypted envelope itself, as well as keywords chosen by the sender to aid in indexed searches, and bears the same name (but a different file extension) as the encrypted envelope. Because encrypted messages and attachments under prior art are not searchable, this embodiment represents a unique and novel method to allow indirectly searching a collection of transmitted encrypted envelopes for particular words or phrases. Upon receipt, a recipient can extract the text file from the encrypted envelope, and save it and the envelope together in a file directory on the recipient's computer. With a plurality of such envelopes and text files in a single directory, a method exists to search the text files for a particular word or phrase, and to open the correspondingly named encrypted envelopes for the original items. When the text files are not being used, they can be encrypted locally using file encryption utilities of the local operating system for enhanced security. Additionally or alternatively, such search facilities can be created at the Recipient Password Server to enable authenticated users to conduct such searches at the Recipient Password Server remotely over the network, except that at the Recipient Password Server, the text files are encrypted symmetrically with server-based keys, only properly authenticated recipients have access to the files which they are authorized to search, and the text files do not need to be extracted from the envelopes but are stored at the server (pending decryption and use) as cryptotransformations of the originals that were generated prior to insertion into the envelopes themselves.

In all embodiments, the Recipient Password Server also keeps a record of each transaction and of the cryptographic identifiers, expressed as a message digest value, or in a second preferred encryption embodiment, a message digest value and detached digital signature value, of the envelope that was transmitted. The Recipient Password Server securely archives all such data and logical associations, appropriately encrypting those fields per legal or business requirements, such as personally identifiable information, and generates the corresponding decryption codes and transaction information for future use and retrieval, making the transaction data available in decrypted plaintext as needed for machine processes or user interfaces, as described in this specification.

In the preferred embodiment, the main server will be the host server that accommodates and effectuates requests for service and related electronic transmissions. It digitally signs and encrypts envelopes for transmission, capturing as appropriate message digests and/or detached digital signatures. It decrypts data and verifies message digests and detached digital signatures and reports on the authenticity of uploaded envelopes and on the status and the results of transmission to authorized requesters. It stores message digests and/or detached digital signatures along with related meta-data of transactions. It securely stores recipient passwords, decrypts them as needed and uses them to generate symmetric keys for the encryption of envelope. It authenticates machines and humans. It tracks customer enrollment, billing and payment accounts and user identities. It securely archives information for future use and/or reference; and encrypts information stored by it in accordance with legal and business requirements and decrypts it as necessary. It reports on transaction and document, data and object status to authenticated users as necessary and appropriate. The main server is the central processing unit that serves to authenticate and bill or and effectuate payment for transactions and to effectuate encryption and decryption functions as previously described in this specification.

It is also possible, as will be appreciated by those skilled in the art, for the server to perform only some of these functions, and for other servers to perform other of them in conjunction with each other, so that more than one central processing unit may be involved. Although the preferred embodiment is written for the prior art Adobe Acrobat Reader and/or full Acrobat program as the basis for the envelope, the teaching is applicable to other password-protected formats such as ZIP, TAR, MS-Word or XML files. It is also possible for some of the servers that communicate with the Recipient Password Server to provide some of the functions for user interfaces, digital signatures, encryption, message digesting and storage that have been described for convenience in this specification as being performed by the Recipient Password Server. It is similarly possible for more than one human being to be involved in an action which has been conveniently described as having been performed by a sender or recipient in this specification, so that one or a plurality of human beings are involved, or that where a human or machine have been described, that one or more humans and one or more machines together are involved in an action. All such possibilities are within the scope of the benefits, novel and unanticipated uses of the inventions.

The main server structurally effectuates all actions and storage of the information generated by the invention and its related processes, systems, and methods. The main server receives the electronic requests for transmissions, and disseminates the actions taken in response to the requests via machine-to-machine transfers or alternatively via email. It functions to encrypt envelopes using recipient passwords and to enable recipients to establish and update passwords, and using message digests and/or detached digital signatures, verifies the authenticity of envelopes as audit information, in response to the requests of authenticated requestors.

The interconnections between the servers include any and all networks and or systems or applications that facilitate the sending and receipt of encrypted attachments, and any and all infrastructure necessary. The various processing systems may also include multiple and various types of computers, such as a mainframe computer which may be preferably coupled to a Wide Area or Local Area Network by means of communications link. Those skilled in the art will appreciate that any such computer may be located a great geographic distance from the WAN or LAN.

With respect to the above description then, it is deemed readily apparent and obvious to one skilled in the art, that all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

CONCLUSIONS, RAMIFICATIONS AND SCOPE

Accordingly, it can be seen that the above system allows requestors to effectuate electronic service, service of process and secured document delivery of electronic documents, messages and objects of all kinds using the Internet and other computer networks, whether effectuated by remove computer or handheld device. Although the description above contains much specificity, this should not be construed as limiting the scope of the invention but as merely providing illustrations of some of the presently preferred embodiments of this invention.

Thus the scope of the invention should be determined by the appended claims and their legal equivalents, rather than by the description and examples given.

What is claimed is:

1. An encryption messaging method at a server comprising:
   a. enabling an authorized sender using a user interface to
      i. input text into one or a plurality of fields to create at least one of a distribution list of one or a plurality of receivers of the message, a subject line, a message body, and/or one or a plurality of optional keywords for message searches,
      ii. optionally upload one or a plurality of files to the server as attachments to the message; and
      iii. activate the server;
   b. Upon an activation by the authorized sender, the server
      i. creates a virtual envelope for the message and any attachments to the message;
      ii. selects a unique filename for the envelope;
      iii. generates a text file with the same filename except for extension that contains at least one sender-inputted text field and the current date and time for inclusion as a message attachment in the envelope;
      iv. includes within the envelope at least the message, the text file, and any files provided by the sender for inclusion as message attachments;
      v. digitally signs the envelope; and
      vi. encrypts a version of the envelope for each intended recipient, using a key that is based upon or derived from a password of such intended recipient.

2. The method of claim 1 whereby the server
   a. generates an email message directed to each such recipient with a message body stating at least that an encrypted envelope is attached;
   b. attaches the envelope that was encrypted using the password of a recipient to the email message intended for such recipient;
   c. transmits such email with attached envelope to each such recipient.

3. The method of claim 1 whereby the server, upon request of a sender to obtain a receipt from a recipient for the envelope,
   d. generates an email message directed to each such recipient that at least informs the recipient that an encrypted message from the sender is available, provides a link for retrieval, and supplies a unique identifier that is logically associated with a file location of the recipient-password encrypted envelope;
   e. when the link is activated, enables the location and download of the encrypted envelope to the recipient;
   f. through a user interface, states that a retrieval of the encrypted envelope constitutes at least an acknowledged receipt by an intended recipient;
   g. records at least a retrieval of the encrypted envelope;
   h. generates a receipt for a retrieved encrypted envelope and notifies the sender of the same.

4. The method of claim 3 whereby the server generates a receipt with formatted text that acknowledges receipt by the recipient for the retrieved encrypted envelope, references it at least by filename and/or message digest and the date and time of retrieval, and digitally signs the receipt as a signature authorized by the recipient.

5. The method of claim 1 whereby the server captures for storage at least a message digest of the envelope, the current date and time, and the sender's identifier, and it optionally encrypts for storage a copy of the message digest with a private key of the server.

6. The method of claim 1 whereby upon a request of an authenticated requester, the server generates and provides through a user interface from a collection of stored data records of a plurality of message transmissions at least:
   i. A date and time of transmission of a message,
   j. An identifier of a sender,
   k. An identifier of at least one receiver,
   l. If the requester provides a duplicate of an encrypted envelope or a message digest of an encrypted envelope for verification as to authenticity, the server determines whether the stored message digest on the one hand and the provided message digest or a currently extracted message digest of the provided copy of the encrypted envelope on the other hand are identical, and reports appropriately on the determination to the requestor,
   m. Whether a receipt was generated.

7. The method of claim 6 whereby an encrypted message digest is first decrypted before comparing it with another message digest.

8. An apparatus for a server based encryption messaging system consisting of:
   a. a computer, with
      i. at least one central processing unit,
      ii. a memory,
      iii. a storage device,
      iv. a network connection, v. at least one database, with at least a collection of passwords that are each logically associated with an identity and/or an email address of a user and known only to such user,
vi. a plurality of computerized instructions,
vii. at least one symmetric encryption algorithm,
viii. at least one hashing algorithm,
ix. optionally, a private asymmetric key;
b. when a message with one or a plurality of optional attachments is directed to an email address and/or identity that is logically associated with a password of such user,
   i. within the computer memory, by computerized instructions,
      1. the user's password is retrieved from the database,
      2. a key is generated using a symmetric encryption algorithm and the password as an input,
      3. the message including such optional attachments is encrypted with such key,
      4. a message digest is captured of such encrypted message and optional attachments,
      5. optionally a copy of the message digest is encrypted using a private asymmetric key,
   ii. the symmetrically encrypted message is either
      a. transmitted via the network to such user; or
      b. saved to the storage device for retrieval by such user with notice sent to such user via the network,
   iii. within a database, a record is created of the date and time, and at least one of
      1. the message digest,
      2. the optional encrypted message digest,
      3. the recipient,
      4. the email address,
   iv. if the encrypted message and optional attachments is retrieved by a recipient, a database record of transmission is updated with the date and time of such retrieval.

* * * * *